Figure 1:
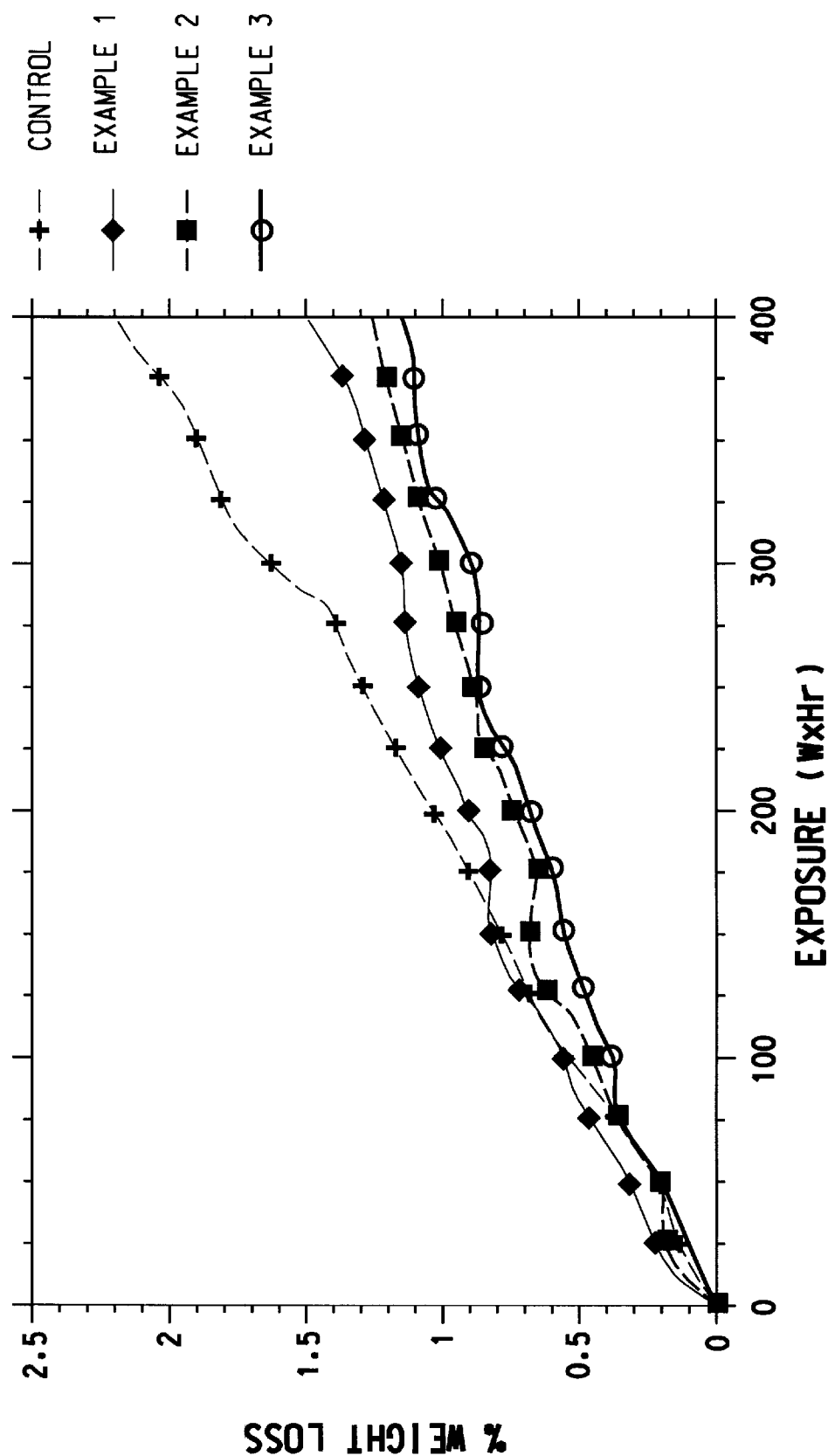

United States Patent [19]
Legare et al.

[11] Patent Number: 5,986,012
[45] Date of Patent: Nov. 16, 1999

[54] FLUORINATION OF RADIATION CROSSLINKED PERFLUOROELASTOMERS

[75] Inventors: John Michael Legare, Newark; Anestis Leonidas Logothetis, Wilmington, both of Del.

[73] Assignee: E. I. du Pont de Nemours and Company, Wilmington, Del.

[21] Appl. No.: 08/016,644

[22] Filed: Feb. 12, 1993

Related U.S. Application Data

[63] Continuation-in-part of application No. 07/747,318, Aug. 20, 1991, abandoned, which is a continuation-in-part of application No. 07/347,329, Apr. 24, 1989, abandoned.

[51] Int. Cl.[6] .............................. C08F 14/26; C08F 14/18; C08F 8/22; C08C 19/14
[52] U.S. Cl. .................................... 525/326.2; 525/326.4; 525/356; 522/131; 522/156
[58] Field of Search .................................... 522/131, 132, 522/156; 525/326.2, 326.4, 356

[56] References Cited

U.S. PATENT DOCUMENTS

| | | | |
|---|---|---|---|
| 3,116,226 | 12/1963 | Bowers, III | 204/154 |
| 3,682,872 | 8/1972 | Brizzolara et al. | 260/80.76 |
| 4,035,565 | 7/1977 | Apotheker et al. | 526/249 |
| 4,621,107 | 11/1986 | Lagow et al. | 522/132 |
| 4,668,357 | 5/1987 | Marchionni et al. | 204/157.9 |
| 4,675,380 | 6/1987 | Buckmaster et al. | 528/481 |
| 4,687,708 | 8/1987 | Batzar | 428/339 |
| 4,743,658 | 5/1988 | Imbalzano et al. | 525/326.4 |
| 4,948,844 | 8/1990 | Nakahara et al. | 525/356 |
| 4,972,038 | 11/1990 | Logothetis | 526/247 |

*Primary Examiner*—Susan W. Berman

[57] ABSTRACT

This invention concerns a process for fluorinating a perfluoroelastomer which has previously been crosslinked by exposure to ionizing radiation. The resulting product has reduced outgassing. This makes perfluoroelastomer parts that have undergone the process particularly useful in clean rooms and for semiconductor manufacturing.

17 Claims, 1 Drawing Sheet

FLUORINATION OF RADIATION CROSSLINKED PERFLUOROELASTOMERS

This is a Continuation-in-part of Ser. No. 07/747,318, filed Aug. 20, 1991, now abandoned, which is a continuation-in-part of Ser. No. 07/347,329, filed Apr. 24, 1989, now abandoned.

FIELD OF THE INVENTION

This invention concerns a process for fluorinating radiation crosslinked perfluoroelastomers to improve the thermal stability of such materials, as by reducing the amount of outgassing on heating, and improving compression set resistance at higher temperatures. Also disclosed are perfluoro (methyl vinyl ether)/tetrafluoro-ethylene copolymers treated in such a manner.

TECHNICAL BACKGROUND

Perfluoroelastomers are used where high temperature and/or chemical resistance are required in rubber parts, as in seals. These materials are typically crosslinked through small amounts of curesite monomers incorporated into the polymer chains to provide reactive crosslinking sites. However, for some uses, crosslinking using added chemicals is not necessarily desirable, since it may lead to outgassing of low molecular weight species from the crosslinked polymer, particularly at high temperatures, which can lead to chemical contamination of "clean" environments.

Perfluoroelastomers may also be cured by exposing them to ionizing radiation, which does not deliberately introduce new chemical species into the polymer. However, exposure to the radiation often results in relatively unstable groups being produced in the crosslinked perfluoroelastomer. It has now been found that fluorination destroys many of these unstable groups, resulting in a product with relatively low outgassing.

The fluorination of perfluorinated thermoplastics to remove "impurities" or relatively unstable groups is known, see for instance U.S. Pat. Nos. 4,675,380, 4,687,708 and 4,743,658. Partially fluorinated polymers have also been treated with fluorine to form a perfluorinated polymers, see U.S. Pat. No. 4,948,844. It is believed that none of these patents involve crosslinked polymers.

SUMMARY OF THE INVENTION

This invention concerns a process for fluorinating a crosslinked perfluoroelastomer, comprising, contacting, at a temperature of about −50° C. to about 200° C., fluorine at a partial pressure of about 25 kPa to about 5.0 MPa, and a perfluoroelastomer which has been crosslinked by exposure to radiation.

DETAILS OF THE INVENTION

The perfluoroelastomers used herein have been previously crosslinked by ionizing radiation. The crosslinking of such polymers is described in commonly assigned U.S. Pat. No. 5,260,351, filed Aug. 20, 1991, which is hereby included by reference. The crosslinking is carried out by exposing a perfluoro-elastomer to ionizing radiation, such as is generated by a Van de Graaf electron beam accelerator to which is attached a system for uniformly exposing the perfluoroelastomer. A radiation dose of about 2 to 20 megarads of radiation is usually satisfactory.

While any perfluoroelastomer may be used, a preferred perfluoroelastomer used herein has at least 95 mole percent, more preferably at least 98 mole percent, of its repeat units derived from tetrafluoro-ethylene and perfluoro(methyl vinyl ether). This perfluoroelastomer may be a dipolymer of tetrafluoro-ethylene and perfluoro(methyl vinyl ether), or a perfluoroelastomer containing 0.1 to 5 mole percent, more preferably about 0.2 to about 2 mole percent, of a curesite monomer. By a curesite monomer is meant a monomer, usually perfluorinated, which contains a "reactive" group which may be chemically (as opposed to being crosslinked only by radiation) crosslinked. Such curesite monomers may be cyano-substituted perfluoro-(alkyl vinyl ethers) as described in U.S. Pat. No. 4,281,092, and/or bromine containing olefins as described in U.S. Pat. No. 4,035,565, and or perfluoro-phenoxy substituted olefins described in U.S. Pat. Nos. 3,467,638 and 3,682,872.

In another preferred perfluoroelastomer, at least about 95 mole percent of the repeat units are derived from tetrafluoroethylene and $CF_2=CF[OCF_2CF(CF_3)]qOC_3F_7$, wherein q is 0 or an integer of 1 to 10. Other preferred perfluoroelastomers are those in which 95% of the repeat units are derived from: tetrafluoroethylene and a perfluoro(alkyl vinyl ether) wherein the alkyl group contains 1 to 4 carbon atoms; or tetrafluoro-ethylene, a perfluoro(alkyl vinyl ether) wherein the alkyl group contains 1 to 4 carbon atoms, and $CF_2=CF[OCF_2CF(CF_3)]qOC_2F_7$ wherein q is 0 or an integer of 1 to 10.

The fluorination is carried out at −50° C. to about 200° C., preferably about 25° C. to about 100° C. The fluorine partial pressure is about 25 kPa to about 5.0 MPa. The atmosphere may be pure fluorine gas, but it is preferred to dilute the fluorine with an inert gas such as nitrogen. It is preferred if the mixture with inert gas is about 1% to about 50% by volume of fluorine.

Although any amount of fluorination is beneficial, it is preferred if the fluorination is carried out for a long enough period so that the fluorine penetrates into, and reacts with all of the perfluoroelastomer. The time required for such fluorinations will vary, depending upon several factors. Decreasing the thickness of the perfluoroelastomer piece, and/or raising the temperature of fluorination, and/or raising the fluorine partial pressure will shorten the time needed for satisfactory fluorination.

After being fluorinated, radiation crosslinked perfluoroelastomers exhibit lower outgassing when heated, and better resistance to an oxygen plasma (see Examples 1–5). This is particularly valuable when perfluoroelastomer parts are used in environments where minimal chemical contamination is required, such as in clean rooms and in semiconductor manufacturing operations. The radiation crosslinked perfluoro-elastomer fluorinated herein may contain the usual fillers used in such applications such as carbon black, barium sulfate, titanium dioxide and calcium carbonate. Of course any filler used should be inert towards fluorine. It is preferred if no filler is used for applications in the semiconductor industry.

One type of unstable group in the radiation crosslinked perfluoroelastomers is carboxyl groups (which herein includes carboxylate groups and acid dimer and monomer groups). These may be readily detected in the polymer by infrared spectroscopy. It is preferred if the number of carboxyl groups in the polymer after treatment with fluorine is less than about 1000 per million carbon atoms, more preferably less than about 600 per million carbon atoms. This is particularly true in polymers in which tetrafluoroethylene and perfluoro(methyl vinyl ether) derived units are 95 mole percent or more of the repeat units of the polymer.

In such polymers, the carboxyl group content per million carbon atoms, N, can be determined by the following method, which is the method to be used for determining carboxyl group content stated in the claims, and is also used in the Examples herein:

An infrared spectrum is obtained on a film approximately 0.25 mm thick (this film may have to be microtomed from the bulk sample, since the perfluoro-elastomer is crosslinked). The Absorbances of these absorption bands are measured: Thickness Band at about 2360 cm$^{-1}$, the absorbance being measured at the peak maximum to a straight baseline drawn between the peak minima near 2700 and 2200 cm$^{-1}$; Acid Dimer Band at about 1775 cm$^{-1}$, the absorbance being measured from the peak maximum to a straight baseline drawn between the peak minima at about 1830 and 1730 cm$^{-1}$; Carboxylate Band at about 1700 cm$^{-1}$, the absorbance being measured from the peak maximum to a straight baseline drawn between the peak minima at about 1730 and 1620 cm$^{-1}$. The number of acid dimer groups per million carbon atoms ($N_{AD}$) is calculated from the following equation:

$$N_{AD} = \frac{67 \text{ (Absorbance of the Acid Dimer Band)}}{0.061 \text{ (Absorbance of Thickness Band)}}$$

The number of carboxylate groups ($N_{CG}$) is calculated from:

$$N_{CG} = \frac{12,000 \text{ (Absorbance of Carboxylate Band)}}{\text{Absorbance of Thickness Band}}$$

The number of carboxyl groups per million carbon atoms (N) is then:

$$N = N_{AD} + N_{CG}$$

In the Examples, the following abbreviations are used:

8CNVE—perfluoro(4,7-dioxa-5-trifluoromethylnon-8-ennitrile) (CA# 69804-19-9)

PMVE—perfluoro(methyl vinyl ether)

TFE—tetrafluoroethylene

In the Examples, the following procedures were used for physical testing:

Compression set—ASTM D395-89, Method B, and D1414-90

Tensile and elongation—ASTM D1708, and ASTM D1414-90

EXAMPLES 1–6

In a shaker tube were placed 7 O-rings (AS568A-214) molded from a TFE/PMVE/8CNVE perfluoroelastomer of about 67.5/32/0.5 molar ratio. These O-rings had been previously crosslinked by exposure to an electron beam irradiation (14 Mrads) and postcured at 150° C./24 h (for details see U.S. Pat. No. 5,260,351 filed Aug. 20, 1991). The tube was evacuated and then pressured to 1.38 MPa with a gaseous mixture of fluorine and nitrogen at 25/75 ($F_2/N_2$) ratio. The tube was maintained at 40° C. for 6 h. The gases were then vented, the tube flushed with nitrogen to remove any residual fluorine, the tube opened and the O-rings removed. The O-rings were placed in an oven at 80° C./24 h to remove any adsorbed gases.

Examples 2–6 were done by the same procedure, except that the fluorination conditions were varied, as given below. The fluorine/nitrogen mixture composition and pressure were the same as for Example 1.

| Example | Temperature (° C.) | Time (h) |
|---|---|---|
| 2 | 70 | 6 |
| 3 | 100 | 6 |
| 4 | 75 | 6 |
| 5 | 150 | 6 |
| 6* | 70 | 4 |

*Cured in an electron beam with 12 megarads of radiation, and postcured at 175° C. for 24 h.

Various test results are given below for these Examples. "Controls" were crosslinked and otherwise treated in the same manner as the samples in the Examples, except the Controls were not fluorinated.

The O-rings were tested for tensiles and compression set resistance and the results are shown in Tables 1, 3 and 5.

TABLE 1

PROPERTIES OF FLUORINATED RADIATION CURED O-RINGS

|  | CONTROL | Example 1 | Example 2 | Example 3 |
|---|---|---|---|---|
| TENSILES |  |  |  |  |
| $M_{50}$, MPa | 1.85 | 1.24 | 1.23 | 1.14 |
| $M_{100}$, MPa | 3.40 | 2.09 | 2.12 | 1.92 |
| $T_b$, MPa | 8.24 | 8.10 | 7.75 | 8.13 |
| $E_b$, % | 189 | 244 | 243 | 281 |
| CONPRESSION SET |  |  |  |  |
| 150° C./70 h | 4 | 4 | 6 | 5 |

The O-rings were tested by thermogravimetry/infra-red analysis (TGA/IR) as described below.

Approximately 1 g of sample is placed in the weighing boat of the TGA apparatus. The compartment is seated under a nitrogen purge and is heated under a controlled temperature ramp. The off gases are passed through a 20 cm cell which is scanned continuously with FT-IR spectrometer. The 20 cm cell and transfer lines are maintained at 240° C. throughout the experiment. All volatile gases evolving from the sample are passed through the cell. After allowing the high boiling gases (b.p. above 150° C.) to condense out of the system, the room temperature gases are collected into a gas bag and transferred to a 10 m cell. The use of the gas bag allows detection of gases that evolve slowly throughout the experiment or gases which are in quantities below the detection limit. The 10 m cell is therefore helpful in finding low levels of gases that are missed in the 20 cm cell. The HF generated is measured as $SiF_4$. The results are shown in Table 2. It is clear that in both series of experiments the control showed the highest amounts of volatiles generated as the sample went through a 24° C. to 450° C. heating cycle. The fluorinated samples in all cases showed significantly lower generation of volatile products (see Tables 2 and 4).

TABLE 2

TGA/IR RESULTS FOR FLUORINATED PERFLUOROELASTOMERS

| | GASES EVOLVED (mg/g of sample) | | |
|---|---|---|---|
| EXAMPLE | $CO_2$ | $SiF_4$ | CO |
| Control | 1.12 | 0.796 | 0.538 |
| 1 | 0.532 | 0.281 | 0.240 |

TABLE 2-continued

TGA/IR RESULTS FOR FLUORINATED PERFLUOROELASTOMERS

| | GASES EVOLVED (mg/g of sample) | | |
|---|---|---|---|
| EXAMPLE | $CO_2$ | $SiF_4$ | CO |
| 2 | 0.533 | 0.192 | 0.228 |
| 3 | 0.660 | 0.373 | 0.236 |

1. Under nitrogen, Temp. 24–450° C. a 5°/min.

The O-rings were also tested by exposing them to oxygen and oxygen/$C_2F_6$ (1:1) plasmas in a Branson IPC plasma etcher.

The weight loss of O-rings exposed to oxygen plasma was followed as follows: the O-rings were first washed with a fluorinated solvent (1,1,2-trichloro-1,2,2-trifluoroethane) and dried overnight in a vacuum oven at 80° C. Then they were weighed and introduced into the IPC-Branson etcher where they were exposed to an oxygen plasma at 50 W and 0.5 torr for 8 h. The O-rings were weighed at certain intervals during the exposure. The results as shown in FIG. 1 indicate that upon fluorination (Examples 1, 2 and 3) the weight loss is only half of that of the control.

Examples 1, 2 and 3 using "fluorinated clear Kalrez®", are represented on FIG. 1 by Graphs labeled: Ex. 1, Ex 2, and Ex. 3 and can be compared to "Clear Kalrez®", labeled "Control" on FIG. 1.

In another series of experiments O-rings were exposed to oxygen and oxygen/$C_2F_6$ plasma at three exposure conditions: 50 W and 0.5 torr for 0.5 h, at 200 W and 0.5 torr for 2 h and at 200 W and 0.5 torr for 4 h. The surface changes were followed by electron spectroscopy for chemical analysis (ESCA) for the top 10 nanometers and their surface morphology by scanning electron microscopy. The results qualitatively indicated that there was a small amount of surface chemical degradation upon exposure to the plasma for the control where as there is no detectable amount of degradation for the O-rings from Examples 1, 2 and 3.

TABLE 3

COMPRESSION SET RESISTANCE OF FLUORINATE O-RINGS

| EXAMPLE | COMPRESSION SET 150° C./70 h |
|---|---|
| CONTROL | 14 |
| 4 | 9 |
| 5 | 16 |

TABLE 4

TGA/IR RESULTS FOR FLUORINATED PERLFLUOROELASTOMERS

| | GASES EVOLVED (mg/g of sample) | | |
|---|---|---|---|
| EXAMPLE | $CO_2$ | $SiF_4$ | CO |
| Control | 0.70 | 0.776 | 0.015 |
| 4 | 0.540 | 0.187 | 0.103 |
| 5 | 0.323 | 0.131 | 0.058 |

1. Under nitrogen, Temp. 24–450° C. a 5°/min.

TABLE 5

PHYSICAL PROPERTIES OF FLUORINATED PERFLUOROELASTOMER

| | O-RINGS | |
|---|---|---|
| | CONTROL | EXAMPLE 6 |
| TENSILE PROPERTIES | | |
| $M_{50}$, MPa | 171 | 140 |
| $M_{100}$, MPa | 301 | 236 |
| $T_b$, MPa | 1202 | 1206 |
| $E_b$, % | 243 | 283 |
| HARDNESS, SHORE A | 73 | 69 |
| COMPRESSION SET | | |
| 150° C./70 h | 27 | 14 |
| 200° C./70 h | 72 | 33 |

The infrared peaks used to calculate the number of carboxyl groups per million carbon atoms ("N" as described in the text) were:

| 2358 $cm^{-1}$ | Thickness Band |
|---|---|
| 1773 $cm^{-1}$ | Carboxylic acid absorption |
| 1726 and 1676 $cm^{-1}$ | Carboxylate anion |

TABLE 6

INFRARED SPECTRA OF FLUORINATED PERFLUOROELASTOMERS

| | GROUPS PER $10^6$ CARBON ATOMS | |
|---|---|---|
| | $COO^-$ | COOH |
| STARTING POLYMER | 589 | — |
| IRRADIATED (14 MRADS) | — | 3190 |
| EXAMPLE 1 | — | 570 |
| EXAMPLE 2 | — | 530 |
| EXAMPLE 3 | — | 420 |

What is claimed is:

1. A process for reducing the outgassing of a crosslinked perfluoroelastomer, comprising, contacting, at a temperature of about −50° C. to about 200° C., fluorine at a partial pressure of about 25 kPa to about 5.0 MPa, and a perfluoroelastomer which has been crosslinked by exposure to radiation.

2. The process as recited in claim 1 wherein said temperature is about 25° C. to about 100° C.

3. The process as recited in claim 1 wherein at least 95 mole percent of repeat units in said perfluoro-elastomer are derived from tetrafluoroethylene and perfluoro(methyl vinyl ether).

4. The process as recited in claim 2 wherein at least 95 mole percent of repeat units in said perfluoro-elastomer are derived from tetrafluoroethylene and perfluoro(methyl vinyl ether).

5. The process as recited in claim 1 wherein at least 98 mole percent of repeat units in said perfluoro-elastomer are derived from tetrafluoroethylene and perfluoro(methyl vinyl ether).

6. The process as recited in claim 5 wherein a cure-site monomer which contains a cyano, bromine or perfluorophenoxy group is present in said perfluoroelastomer.

7. The process as recited in claim 5 wherein said perfluoroelastomer has a plurality of carboxyl groups before said contacting, and has less than 1000 carboxyl groups per million carbon atoms after said contacting.

8. The process as recited in claim 5 wherein said perfluoroelastomer has a plurality of carboxyl groups before said contacting, and has less than 600 carboxyl groups per million carbon atoms after said contacting.

9. The process as recited in claim 4 wherein said perfluoroelastomer has a plurality of carboxyl groups before said contacting, and has less than 1000 carboxyl groups per million carbon atoms after said contacting.

10. The process as recited in claim 9 wherein a cure-site monomer which contains a cyano, bromine or perfluorophenoxy group is present in said perfluoroelastomer.

11. The process as recited in claim 1 wherein filler selected from carbon black, barium sulfate, titanium dioxide, calcium carbonate and a mixture thereof, is present.

12. The process as recited in claim 1 wherein no filler is present.

13. The process as recited in claim 1 wherein at least 95 mole percent of repeat units in said perfluoroelastomer are derived from: tetrafluoro-ethylene and $CF_2=CF[OCF_2CF(CF_3)]qOC_3F_7$, wherein q is 0 or an integer of 1 to 10; tetrafluoroethylene and a perfluoro(alkyl vinyl ether) wherein the alkyl group contains 1 to 4 carbon atoms; or tetrafluoroethylene, a perfluoro(alkyl vinyl ether) wherein the alkyl group contains 1 to 4 carbon atoms and $CF_2=CF[OCF_2CF(CF_3)]qOC_3F_7$, wherein q is 0 or an integer of 1 to 10.

14. The product of the process of claim 1.
15. The product of the process of claim 4.
16. The product of the process of claim 7.
17. The product of the process of claim 10.

* * * * *